Sept. 29, 1970         C. C. SOVIA         3,530,608
TRANSPARENCY MOUNT
Filed June 4, 1968
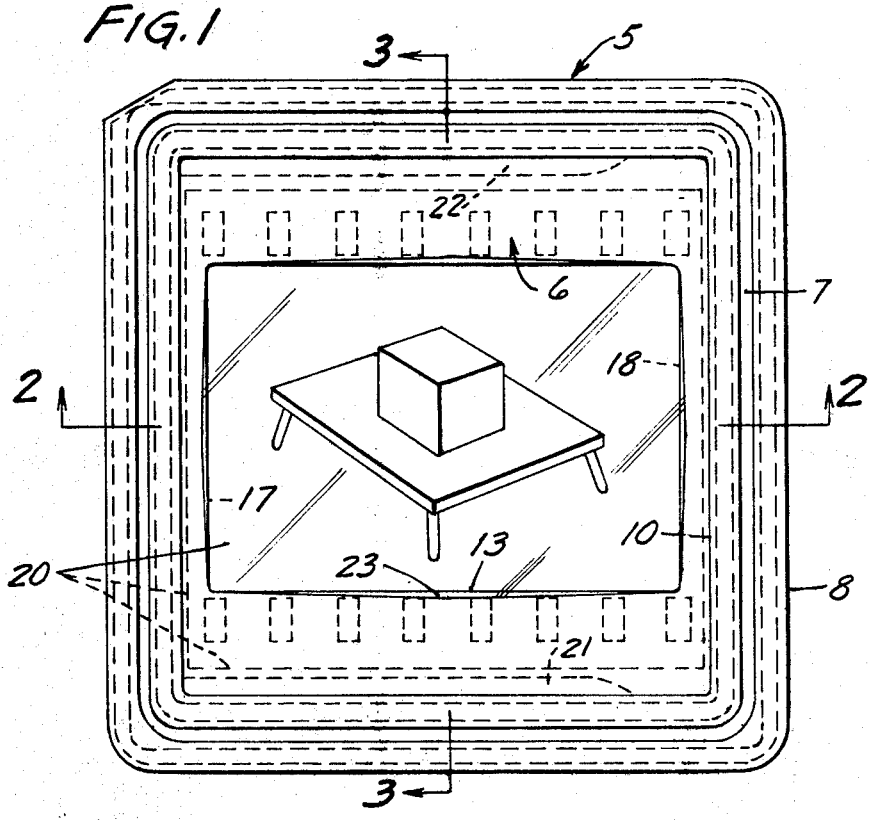
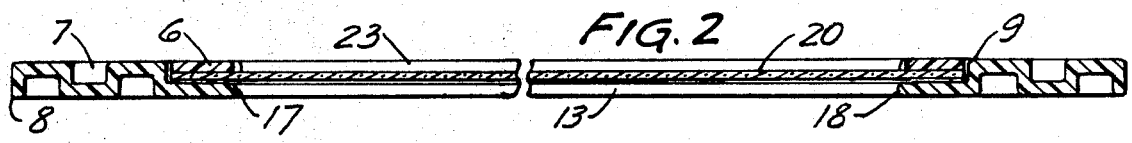
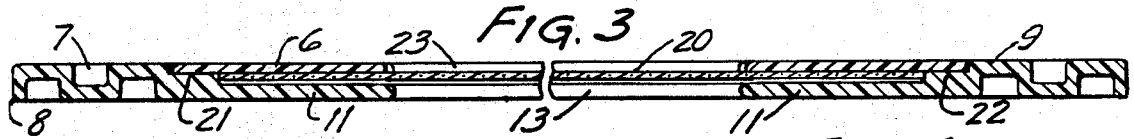
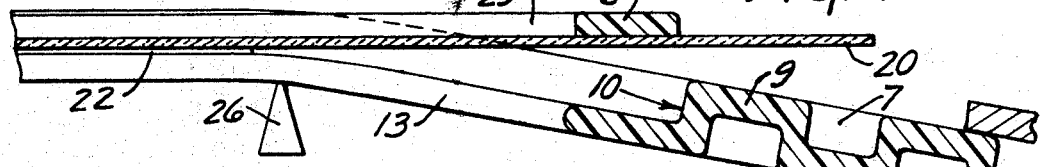
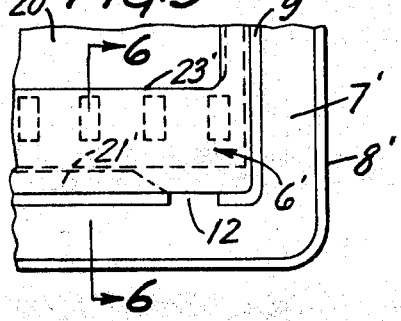
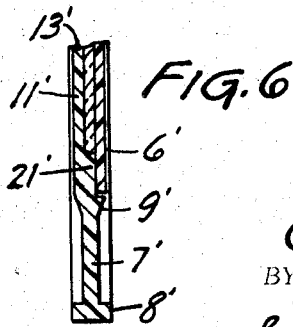
INVENTOR.
CEDRIC C. SOVIA
BY Kinney, Alexander,
Sell, Steldt & DeLaHunt
ATTORNEYS United States Patent Office 3,530,608
Patented Sept. 29, 1970

3,530,608
TRANSPARENCY MOUNT
Cedric C. Sovia, Forrest Lake, Minn., assignor to Minnesota Mining and Manufacturing Company, St. Paul, Minn., a corporation of Delaware
Continuation-in-part of application Ser. No. 668,456, Sept. 18, 1967. This application June 4, 1968, Ser. No. 734,386
Int. Cl. G09f 1/12
U.S. Cl. 40—159         9 Claims

ABSTRACT OF THE DISCLOSURE

A light-weight transparency mount formed of a molded frame piece and a stamped cap welded together defining a pocket which captures the transparency and which affords insertion and removal of the transparency by flexing the frame piece.

CROSS REFERENCE TO RELATED APPLICATION

This application is a continuation-in-part of copending application Ser. No. 668,456, filed Sept. 18, 1967 and which is now abandoned.

This invention relates to an improved transparency mount and in one aspect to an improved polymeric slide mount which is assembled prior to insertion of the transparency and which will permit easy insertion and removal of the transparencies.

The prior art is replete with transparency mounting structures and the art varies from the most common pasteboard mount, which comprises two symmetrical pieces pasted together, sandwiching the transparency therebetween, similar to that illustrated in U.S. Pat. No. 2,184,007, to frames which are fitted or snapped together to assemble a slide mount such as shown in U.S. Pat. Nos. 2,806,309; 2,639,530; or 2,477,470. It has more recently however become desirable to have a preassembled slide mount and one which will permit the customer to remove the film transparencies if desired. One example of this latter type of mount is shown in French Pat. No. 1,311,727, published Oct. 29, 1962. This type of slide mount solves the problem of the slide mounts becoming unsnapped or disassembled in the projector during operation of a slide transfer mechanism.

Slide holders which are of a preassembled construction, but which require some special mechanism for the insertion and removal of the transparency are available but have a great disadvantage in that because of their design they are excessively heavy and cannot be shipped in packages of 20 or 22 slides through the mail at the same first class postal rate as afforded the same number of pasteboard mounts. Further, they are expensive to mold and their design makes it necessary for the insertion and removal of the transparency to have a special tool.

It is therefore an object of the present invention to provide a light-weight transparency or slide mount which meets the dimension requirements necessary for use in all present commercial slide projecting equipment, which is durable, i.e., can withstand temperatures present in projectors, which will permit assembly and removal of the transparency, and which is economical to manufacture or which permits the use of less expensive manufacturing techniques.

The present invention has the advantages desired of a slide mount and comprises a molded frame; having rectangular rib means defining a recess, a rectangular wall portion with a central opening forming the base of said recess, means defining a recess on said rectangular wall portion, a border around said rectangular rib terminating in an edge wall, and a stamped or die-cut cap formed to be secured above the recess on said rectangular wall portion to define a pocket for receiving a transparency. The frame is sufficiently flexible such that when a fulcrum is placed under the frame and a downward force is supplied to the opposite edges of the frame, the frame may be flexed away from the cap adjacent one edge permitting the transparency to be removed from the recess beneath the cap or inserted beneath the cap between the two pieces.

The novel features and advantages of the present invention will become apparent after reading the following description which refers to the accompanying drawing wherein:

FIG. 1 is a plan view of one embodiment of the assembled transparency mount with a transparency;

FIG. 2 is an enlarged longitudinal sectional view taken along the line 2—2 of FIG. 1;

FIG. 3 is an enlarged transverse sectional view taken along the line 3—3 of FIG. 1;

FIG. 4 is an enlarged fragmentary longitudinal sectional view of the first embodiment illustrating the flexure of one piece of the mount to permit insertion and removal of the transparency.

FIG. 5 is a fragmentary plan view without the cap of a second embodiment of the present invention; and FIG. 6 is a fragmentary transverse sectional view taken along line 6—6 of FIG. 5 with the cap in place.

The transparency mount of the present invention consists of two pieces, a thermoplastic frame 5 and a thermoplastic cap 6.

The frame 5 of the mount is preferably formed of a thermoplastic material, for example, polystyrene, and may be made by any one of various molding operations, such as injection molding or compression molding. The thermoplastic material of which the frame is made should be of a type which will withstand the heat which it will be subjected to in a slide projector without any deleterious effect on the frame and which will withstand numerous flexings within its elastic limit without breakage.

The frame 5 is a one-piece molding and comprises rectangular rib means 9 defining a first recess, a rectangular wall portion 11 with a central opening forming the base of said recess, means defining a second recess or transparency retaining area on said rectangular wall portion 11 and a border 7 around said rectangular rib terminating in an edge wall 8. The first recess is defined by a central symmetrically disposed generally rectangular rib 9 having inner wall surfaces 10 defining the recess. The first recess has a rectangular base or wall portion 11. The upper portion of the rib 9 may be cut away in areas 12 to afford the frame 5 some greater flexibility but sufficient areas of the rib 9 project above the rectangular wall portion 11 to retain the transparency. The rectangular wall portion 11 is formed with a central rectangular opening 13 to expose one face of the image on the transparency. The recess is rectangular having a size which is between 0.10 inch to 0.6 inch larger in transverse and/or longitudinal dimensions than the opening 13. The opening 13 is formed with the edge walls rounded, as shown in FIG. 2 on walls 17 and 18, to prevent a film transparency 20 from catching on an edge of the opening during insertion or removal of the film in a direction normal to the walls 17 and 18 and to prevent mounts from catching on other mounts in a stack.

Positioned within the walls 10 forming the first recess and formed on the inner face of the frame section 11 adjacent the rib 9 and extending part way along opposite walls 10 are spacers or pads 21 and 22 to which the cap 6 is secured. The pads aid to define a film-receiving second recess which for 35 mm. film is 1.4 inches by 1.52 inches, and define a depth to the pocket between the cap and wall portion 11 of about 0.007 inch. Most film transparencies have a thickness of 0.005 inch. The pocket size can be varied to accommodate other film sizes.

The cap of the transparency mount is a planar sheet with a central opening 23. The cap 6 is stamped or die cut from a sheet of thermoplastic material which is preferably a general purpose polystyrene of medium impact. The cap 6 has outside dimensions of 1.5 inches by 1.5 inches such that it will fit over the transparency and within the rib 9 against the pads 21 and 22 and is formed with the central symmetrical opening 23 in register at the corners with opening 13. This opening 23, formed by stamping or die cutting, has the edges of the opening formed such that each edge is tapered from the corners, which are aligned with the corners in opening 13, toward the center of each edge by having at each corner an angle slightly greater than 90 degrees, as about 91 degrees. The taper of these edges is exaggerated as shown in FIG. 1. This taper at each edge aids in inserting the transparency and prevents stacked mounts from hooking or catching when mounts are moved across the stack.

The cap 6 is assembled within the recess and is secured to the pads 21 and 22 along longitudinal edges of the cap by solvent or sonic welds. The cap 6 has a thickness of between 0.014 and 0.020 inch and in the assembled position, is preferably flush with the upper edge of the rib 9, and in any event does not lie in a plane beyond the plane of the upper edge of edge wall 8. The cap 6 is sufficiently stiff that it will stay in the same plane even when the frame 5 is flexed away from it beyond the weldments to the pads. The cap 6 has outside dimensions substantially less than the peripheral dimensions of the border 7. A pad (not shown) to which the cap may also be welded could be added to extend between pads 21 and 22 on the left-hand edge of the recess formed by rib 9 (as shown in FIG. 1) to more positively identify the edge of the film recess or pocket in which a film transparency may be inserted and removed.

The stamping or die cutting of the cap 6 permits the preprinting of information, i.e., This Side Toward Screen, on the sheet stock before making or stamping the cap therefrom. This allows the mount to be dressed up and for the information to be in a color other than that of the cap so it is more noticeable and legible.

Referring now to FIG. 4, there is illustrated the manner in which the frame 5 is flexed about a fulcrum 26 positioned along a transverse axis of the mount adjacent opposed ends of the pads 21 and 22. When pressure is applied to the border 7 of the frame adjacent the unsealed edge of the cap and the frame is held on the opposite side of the fulcrum, the frame will flex about the fulcrum, opening the pocket along one unsealed edge between the pieces by moving the adjacent wall 10 of the rib 9 to a position below the plane of the cap 6. Thus by grasping the transparency and moving the film to the right, as viewed in FIG. 4, it may be easily slipped out of the recess over the rib 9. Insertion of the film, during mounting of transparencies in the transparency mounts of the present invention, may be accomplished in the same manner. One edge of the border 7 may also be placed in a retaining slot and pressure applied to bend the frame 5 about an edge of the slot positioned below the ends of the pads to open the pocket. This permits the mount to be flexed mechanically allowing mechanized insertion of transparencies between the cap and the rectangular wall portion 11.

The reduced material of the frame by the use of corrugations or a connecting web and flange and the reduction of the size of the cap minimizes the weight of the transparency mount of this invention to an extent permitting 20 to 22 polymeric mounts together with the inserted transparencies to be packaged in a conventional mailer with the package labeled at no additional postage cost. This is accomplished by the mount having a weight of about 1.5 grams. Previously known polymeric mounts using frames and caps which have substantially the same dimension provide a mount having a weight nearly double that provided by the present invention. Such prior mounts are therefore not widely used.

The border 7 comprises square corrugations, as shown in FIGS. 1 through 4, terminating in an edge wall 8 which has a width defining the thickness of the frame. The material of the corrugations has a thickness less than the thickness of the frame, thereby reducing the weight of the frame while the corrugated structure retains much of the rigidity of a solid border.

FIGS. 5 and 6 show the second embodiment of the present invention in which, as in the first embodiment, the frame comprises a generally rectangular rib 9' defining a recess, a rectangular wall portion 11' with a central opening 13' forming the base of the recess, a pair of opposed pads 21' on the wall portion 11' which together with the generally rectangular rib 9' defines a transparency retaining area, and a border 7' around the rectangular rib terminating in an edge wall 8'; and a planar cap 6' that has a central opening 23' corresponding to the opening 13' in the wall portion 11' and which is secured to the pads 21' within the recess defined by the rectangular rib 9'. In this embodiment, however, the border comprises a web 7' and a flange 8', the flange 8' corresponding to the edge wall 8 of the corrugated border in the first embodiment. The web is thin and flat, having a thickness of 0.025 inch and is joined to the center of the peripheral flange 8 which gives the mount an overall thickness of between .044 and .050 inch. The web 7' and flange 8' may be used to further reduce the weight of the frame but unlike the corrugations, the web 7' and flange 8' do not give the border area the characteristics or body substantially similar to a solid border. A solid border, however, is not acceptable primarily because of its weight.

The provision of flexing the frame permits insertion and removal of the transparency without the need for any special tools to open the film pocket.

The use of corrugations or a web and flange is only illustrative of the border area since the shape of the border area is not critical except as to its termination in an edge wall 8 or 8' that extends the full width of the mount and has a volume less than a solid border would offer. Preferably the border should have no large cavities or recesses to interfere with the movement or guiding of the mount.

The terms "above," "blow," "upper," and the like, are relative terms used for purposes of description herein and are not limiting.

Having thus described the present invention with reference to two embodiments it will be understood that minor modifications may be made therein without departing from the spirit and scope of the invention.

What is claimed is:

1. A light-weight polymeric transparency mount comprising:
    a molded frame of polymeric material, which frame comprises:
        rectangular rib means defining a first recess,
        a rectangular planar wall portion with a central opening forming the base of said first recess and joined to one edge of said rib means,
        means defining a second recess centrally on said wall portion of a size for retaining a transparency,
        a border of material having a thickness less than the thickness of said frame joined to said rib means and extending around the periphery thereof, said border terminating with an outer peripheral edge wall having a width defining the thickness of said frame, and
    a rectangular cap secured along two parallel edges to said frame within said first recess and disposed parallel to said wall portion and above said second recess for retaining a transparency in said second recess, said cap having two planar faces, being formed of a polymeric material, and having a central rectangular opening having edges with dimensions corresponding generally to those of the central opening in said rectangular wall portion.

2. A transparency mount according to claim 1 wherein said edges defining said central rectangular opening in said cap are each tapered from the corners toward the center of each edge to enlarge said opening.

3. A transparency mount according to claim 1 wherein said means defining said second recess on said rectangular wall portion comprises opposed pads and said rib means.

4. A transparency mount according to claim 1 wherein said border comprises a plurality of corrugations the outermost of which forms said outer peripheral edge wall.

5. A transparency mount according to claim 1 wherein said border comprises:
  a thin flat web, and
  a flange extending around the outer periphery of said web, which flange defines said outer peripheral edge wall.

6. A light-weight polymeric transparency mount comprising:
  a molded frame of polymeric material, which frame comprises:
    rectangular rib means defining a first recess,
    a rectangular planar wall portion with a central opening forming the base of said first recess and joined to one edge of said rib means,
    a pair of opposed pads on said rectangular wall portion which together with said rib means define a second recess on said wall portion of a size for retaining a transparency,
    a border of material having a thickness less than the thickness of said frame joined to said rib means and extending around the periphery thereof, said border terminating with an outer peripheral edge wall having a width defining the thickness of said frame, and
    a rectangular cap having dimensions to fit in said first recess defined by said rib means upon said pads and being secured along two parallel edges to said pads leaving at least one edge of said cap free from said frame, the secured portion along a said pad being less than the length of an edge of said cap, whereby when the edge of said frame adjacent a said free edge of said cap is secured and force is applied to the edge of said frame opposite said free edge, said frame may be flexed away from said free edge of said cap to afford access to said transparency retaining second recess for insertion or removal of a transparency.

7. A transparency mount according to claim 6 wherein said cap is formed with a central rectangular opening defined by edge walls corresponding generally to said central opening in said planar wall portion and having said edge walls tapered from the corners of the opening to the center by having the angle formed between each adjacent edge wall of said opening slightly exceed 90 degrees.

8. The method of mounting a photographic transparency in a transparency holder having a flexible molded polymeric frame formed with a centrally positioned transparency-receiving recess and a planar cap secured to said frame along two parallel edges of said cap to cover said recess, said method comprising the steps of securing a first edge of said frame which is normal to said two edges of said cap in a fixed position, applying force on said frame near a fourth edge of said frame which is opposite said first edge in a direction to move said frame away from said cap, whereby said frame will be flexed away from a free edge of said cap to afford access to said recess for insertion or removal of a transparency.

9. The method of mounting a photographic transparency in a transparency holder having a flexible molded polymeric frame formed with a centrally positioned transparency-receiving recess and a planar cap secured to said frame along two parallel edges of said cap to cover said recess, and to leave at least one edge of the cap and adjacent portions of said two edges free, said method comprising the steps of securing a first edge of said frame which is normal to said two edges and adjacent to said one free edge of said cap in a fixed position with a fulcrum disposed against said frame on the side opposite said cap, applying force on said frame near a second edge of said frame which is opposite said first edge in a direction to move said frame against said fulcrum and away from sad cap, whereby said frame will be flexed away from said one free edge of said cap to afford access to said recess for insertion or removal of a transparency.

References Cited

UNITED STATES PATENTS

| | | | |
|---|---|---|---|
| 2,528,366 | 10/1950 | Houston | 40—159 |
| 2,643,577 | 6/1953 | Williams | 40—159 X |
| 3,150,457 | 9/1964 | Thieme | 40—152 |
| 3,235,990 | 2/1966 | Back | 40—152 |
| 3,341,960 | 9/1967 | Florjancic | 40—152 |

ENGENE R. COPOZIO, Primary Examiner

W. J. CONTRERAS, Assistant Examiner